United States Patent
Jäckel

(10) Patent No.: US 7,553,222 B2
(45) Date of Patent: Jun. 30, 2009

(54) SAUSAGE PACKAGING APPARATUS FOR FILLING PASTY STUFFING MATERIAL INTO TUBULAR CASING MATERIAL

(75) Inventor: Gunnar Jäckel, Asendorf (DE)

(73) Assignee: TIPPER TIE technopack GmbH (DE)

( * ) Notice: Subject to any disclaimer, the term of this patent is extended or adjusted under 35 U.S.C. 154(b) by 139 days.

(21) Appl. No.: 11/596,532

(22) PCT Filed: Dec. 9, 2004

(86) PCT No.: PCT/EP2004/014036

§ 371 (c)(1),
(2), (4) Date: Nov. 13, 2006

(87) PCT Pub. No.: WO2005/115153

PCT Pub. Date: Dec. 8, 2005

(65) Prior Publication Data

US 2007/0249272 A1    Oct. 25, 2007

(30) Foreign Application Priority Data

May 13, 2004 (DE) ................ 20 2004 007 711

(51) Int. Cl.
*A22C 11/00* (2006.01)

(52) U.S. Cl. .................................................. 452/38
(58) Field of Classification Search ............ 452/21–26, 452/30–37, 46–48, 51
See application file for complete search history.

(56) References Cited

U.S. PATENT DOCUMENTS

RE30,390 E * 9/1980 Kupcikevicius et al. ....... 452/31

(Continued)

FOREIGN PATENT DOCUMENTS

DE       2402817 A1    7/1975

(Continued)

*Primary Examiner*—Thomas Price
(74) *Attorney, Agent, or Firm*—Casimir Jones, S.C.

(57) ABSTRACT

The subject matter of the invention is a sausage packaging apparatus for filling pasty stuffing material into tubular casing material, with a filling pipe (1) which opens at a filling zone (5) and, on its outside, has a receptacle for gathered tubular casing material (80), SO that, in order to fill a sausage (8), the casing material (80), which is sealed on one side, is pulled off from the filling pipe (1) under the pressure of the stuffing material (85) and, when a certain size is reached, is sealed by a sealing device (2), and with a removal device (4), which comprises a moving belt (40), for the sausage (8) filled in this manner. The apparatus according to the invention is characterized in that the moving belt (40) is provided with a drive (43) which can be adjusted in rotational speed and is actuated by a regulating module (64) of a control unit (6), and in that a growth measuring device is provided for the sausage (8), which device has speed measuring means (7) arranged at the filling zone (5), an evaluation unit (67) for determining a growth rate of the sausage (8) and a synchronizing unit (62) which activates the regulating module (64) in such a manner that synchronism is achieved between speed of the moving belt (40) and the growth rate. The invention permits a uniform pulling off of the casing material (80) from the filling pipe (1) and therefore an increased stuffing quality of the sausages (8) produced in this manner.

9 Claims, 3 Drawing Sheets

U.S. PATENT DOCUMENTS

| | | | | |
|---|---|---|---|---|
| 4,258,604 A * | 3/1981 | Giokas | ..................... | 84/383 R |
| 5,158,498 A * | 10/1992 | Frey | ............................ | 452/44 |
| 5,890,955 A * | 4/1999 | Stanley | ........................ | 452/48 |
| 6,245,369 B1 * | 6/2001 | Kobussen et al. | ............ | 426/231 |
| 6,719,621 B2 * | 4/2004 | Hergott et al. | ................. | 452/33 |
| 7,000,816 B1 * | 2/2006 | Mikelsons et al. | ............. | 226/2 |
| 7,033,264 B1 * | 4/2006 | Cate et al. | ..................... | 452/40 |
| 7,040,975 B2 * | 5/2006 | Shefet et al. | .................. | 452/51 |
| 7,052,387 B2 * | 5/2006 | Ilch et al. | .................... | 452/155 |
| 7,140,958 B2 * | 11/2006 | Reutter et al. | ................. | 452/51 |
| 7,310,926 B2 * | 12/2007 | Nikoley et al. | ................ | 53/574 |
| 2002/0042247 A1 * | 4/2002 | Hergott et al. | ................ | 452/31 |
| 2003/0073397 A1 * | 4/2003 | Stanley et al. | ................. | 452/35 |

FOREIGN PATENT DOCUMENTS

| | | |
|---|---|---|
| DE | 4028343 A1 | 3/1992 |
| DE | 19726238 C1 | 1/1999 |
| DE | 29880136 U1 | 5/2000 |
| DE | 10055310 C2 | 7/2003 |
| EP | 0399195 A1 | 11/1990 |
| EP | 0482368 B1 | 4/1992 |
| EP | 0507374 A1 | 7/1992 |
| EP | 0456155 B1 | 12/1994 |
| EP | 0755188 B1 | 1/1997 |
| EP | 1006804 B1 | 6/2000 |
| EP | 1 172 035 A1 * | 4/2001 |
| EP | 1172035 A1 | 4/2001 |

* cited by examiner

SAUSAGE PACKAGING APPARATUS FOR FILLING PASTY STUFFING MATERIAL INTO TUBULAR CASING MATERIAL

The invention relates to a sausage packaging apparatus for filling pasty stuffing material into tubular casing material, with a filling pipe which opens at a filling zone and, on its outside, has a receptacle for gathered tubular casing material. The sausage packaging apparatus is designed in such a manner that, in order to fill a sausage, the casing material, which is sealed on one side, is pulled off from the filling pipe under the pressure of the stuffing material and, when a certain size is reached, is sealed by means of a sealing device. A moving belt is provided in order to remove the sausage filled and sealed in this manner.

Sausage packaging apparatuses of the generic type are known from well-known prior use. They have, as main components, a filling device, a sealing device for the casing material and a removal device for the sausages produced in this manner. The sealing device comprises elements for constricting the strand, which is filled with stuffing material, at the end of the sausage and, if desired, for placing sealing clips. This takes place by the stuffing material, this usually means sausage meat here, being fed to the packaging apparatus from an upstream processing process. The sausage meat flows under pressure through the filling pipe into a tube of casing material that is closed on one side. The casing material is arranged in a gathered store on the filling pipe. The pressure in the filling pipe causes the sausage meat to be stuffed uniformly into the tube of casing material, with further casing material being pulled off from the store counter to a braking force. If a desired length is reached, the tube of casing material is constricted and sealed, if appropriate is also severed. A sausage is thereby produced. It is transported away via the removal device for further treatment. Chutes or moving belts are generally used as removal devices. Although reliable transportation away both of individual sausages and also of entire strings of sausages is therefore made possible, difficulties nevertheless arise in the case of sausages having a relatively large internal diameter. Their heavy weight means that they rest heavily on the removal device. In the case of a moving belt, large frictional forces are thus produced during the filling operation and these attempt to pull the sausage away from the filling zone; in the case of the chute, the output force of the slope causes a similar effect. As a result, the casing material is subjected to the action not only of the compressive force of the emerging sausage meat but additionally also to the frictional forces. The result is that it is pulled off nonuniformly. The stuffing quality and the internal diameter of the sausages produced in this manner are reduced.

The invention is based on the object of improving an apparatus of the type mentioned at the beginning in such a manner that the abovementioned disadvantages, in particular during the filling of large sausages, are reduced.

The solution according to the invention resides in the features of the independent claim. Advantageous developments are the subject matter of the dependent claims.

According to the invention, in the case of a sausage packaging device for filling pasty stuffing material into tubular casing material, with a filling pipe which opens at a filling zone and, on its outside, has a receptacle for gathered tubular casing material, so that, in order to fill a sausage, the casing material, which is sealed on one side, is pulled off from the filling pipe under the pressure of the stuffing material and, when a certain size is reached, is sealed by means of a sealing device, and with a removal device, which comprises a moving belt, for the sausage filled in this manner, it is provided that the moving belt is provided with a drive which can be adjusted in rotational speed and the speed of which can be set by a regulating module of a control unit, and that a growth measuring device is provided for the sausage, which device has speed measuring means arranged at the filling zone, an evaluation unit for determining a growth rate of the sausage and a synchronizing unit which activates the regulating module in such a manner that synchronism is achieved between speed of the moving belt and the growth rate.

A number of terms which are used will be explained below:

A filling zone is understood as meaning that region of the sausage packaging machine in which the casing material is filled with stuffing material, in particular sausage meat, and is sealed.

Sealing in the present case is understood as meaning that the casing material is held together in such a manner that stuffing material does not unintentionally emerge at the ends. Suitable types of sealing means include, in particular, the placing of sealing clips or the twisting off of the casing material.

A drive which can be adjusted in rotational speed can be understood as meaning that the drive, such as a servomotor, sets a certain rotational speed.

Synchronism is understood as meaning that there is no stationary difference in speed or it preferably remains under a tolerance of one tenth of the growth rate.

Growth of the sausage is understood as meaning the rate at which the tube of casing material that is closed on one side is enlarged.

The invention is based on the concept of regulating the speed of the moving belt as a function of the growth rate of the sausage. This makes it possible to match the movement of the removal device in the form of the moving belt to the growth of the sausage. This takes place actively, i.e. the moving belt is guided linearly in its speed according to that of the filling operation. Overloading of the casing material due to the sausage pulling away too early or due to pulling-away forces rising too early and/or too severely can thereby be reliably avoided. Considerable advantages are produced over the prior art, in which the pulling-away force rises with the weight of the sausage. As is known, the weight of a body rises with the cubing of the dimensions (e.g. diameter). Accordingly, if there is a constant coefficient of friction, the pulling-away forces also rise overproportionally as the internal diameter of the sausage increases, which forces have to be absorbed by the casing material in the region of the mouth of the filling pipe. However, said casing material may only absorb a limited tensile stress, with the result that, from a critical size, the casing material is overloaded. Owing to the invention, this disturbing overproportional dependency is eliminated and the pulling-away forces are actively guided to follow the growth of the sausage. This improves the stuffing quality which until now, as the degree of filling of the sausage rose, decreased undesirably the longer the sausage became. The internal diameter also remains constant in the case of very heavy, large and long sausages. The uniformity and therefore also the quality are improved. In addition, owing to the reduced forces, there is greater protection against the casing material tearing. This additionally results in greater operational reliability of the apparatus according to the invention. Owing to the uniformity and safety which are improved according to the invention, the potential for rises in productivity is increased.

The speed measuring means are preferably designed as light barriers. This permits a simple and cost-effective and contact-free measurement of the growth of the sausage. They are free from wear and are operationally reliable. At least one of them is expediently arranged adjustably in its distance from the mouth of the filling pipe. The effect achieved by this is that the positioning of the light barriers can be matched in a simple manner to different lengths of the sausages to be produced. In the case of short and thick sausages, in which detection, which is as rapid as possible, of the growth rate matters, the distance between the light barriers is selected to be short; in the case of long and thin sausages, the distance can be selected to be long in order to increase the measuring accuracy. The adjustment can take place manually, but a servodevice which is actuated by the control unit is advantageously provided. This makes it possible to position the light barriers by means of the control unit in a manner such that they match the apparatus, without additional intervention. In particular if different profiles for different sausages or sizes of sausage are stored in the control unit, this makes it possible to simply and safely change between different sausages to be produced.

In a proven embodiment, the light barriers are integrated into a line sensor. This permits a fine resolution of the measurement. A more accurate detection of the growth is thereby achieved, with the result that the moving belt can be regulated in terms of its speed in a correspondingly more accurate manner. In addition, a line sensor of this type affords the advantage of measuring not just at one point but also over a certain distance. If the size of the line sensor is large enough, then different sizes of sausage can also be detected without adjusting the line sensor. A servodevice for the adjustment is then no longer required.

The light barriers are advantageously designed as double sensors which additionally detect the internal diameter of the sausage. Further functions for monitoring the filling operation can therefore be included. Separate sensors which are frequently still realized mechanically in the prior art are therefore unnecessary.

While measurement using light barriers has the advantage of a technique which is simple and is immune from interference, detecting the speed directly should not, however, be ruled out. In particular, Doppler sensors in a radar or ultrasound technique are also suitable.

The control unit is preferably provided with a clearance detector. This improves the reliability of detection during the production of linked sausages (strings of sausages). Clearance in this case is understood as meaning the constricted region of the strings of sausages that is situated between two adjacent sausages of the string and is not filled with sausage meat.

The removal device expediently comprises a conveyor belt which begins in the ejection region of the moving belt and is operated at a speed independent of the moving belt. The further transportation of the sausages for subsequent processing can therefore be carried out independently of the growth rate of the sausages during the filling operation. A decoupling of the speed of the following treatment from the speed of the packaging operation is therefore achieved. To achieve this advantage, it is not absolutely necessary to provide a conveyor belt; an inclined conveying chute can likewise be provided.

The invention is explained in more detail below with reference to the drawing in which an advantageous exemplary embodiment is illustrated. In the drawing.

Figure 1:
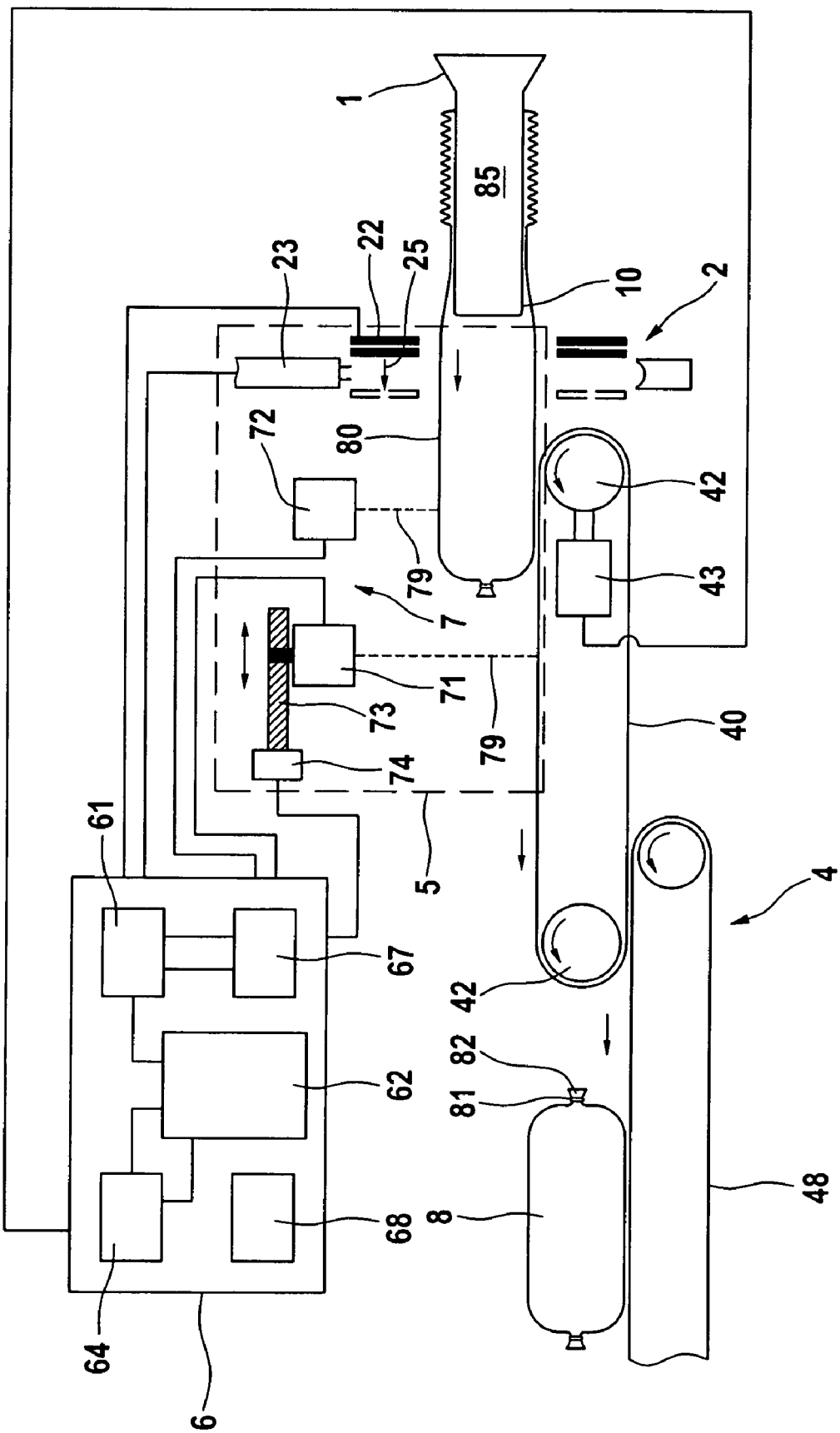
FIG. 1 shows a diagrammatic illustration of a first exemplary embodiment of the apparatus according to the invention.

A first exemplary embodiment of a sausage packaging apparatus according to the invention is illustrated diagrammatically in FIG. 1. It comprises a filling pipe 1, a sealing device 2 arranged just behind a mouth 10 of the filling pipe 1, speed measuring means 7, a control device 6 and a removal device 4. A filling zone 5 is formed between them. A store of tubular casing material 80 is arranged on the filling pipe 1 in a gathered manner. To control the individual devices, a control unit 6 is provided. The working direction of the apparatus runs from the right to the left in the illustration in FIG. 1.

The general construction of a sausage packaging machine of this type is known from the prior art and does not need to be described in more detail here. For easier understanding, the operation will be described briefly. From a preprocessing stage (not illustrated), stuffing material (sausage meat 85) to be packaged in the form of a sausage is fed to a filling pipe 1, at the front end thereof (on the right in the illustration in FIG. 1) at a certain positive pressure. The sausage meat 85 flows under pressure through the filling pipe 1 and, at its mouth 10 (on the left in FIG. 1), enters the tubular casing material 80. The casing material 80 is sealed on one side by means of a sealing clip 81. The sausage meat 85 is stuffed into the casing material 80 under the action of the pressure, with casing material 80 being continuously pulled off from the gathered store. The length of that section of the casing material 80 which is filled with sausage meat 85 grows until a predetermined length is reached. The sealing device 2 is then actuated by the control unit 6. Said sealing device comprises a constricting device 22 and a clip device 23. The constricting device 22 surrounds the strand formed from the filled casing material 80 with a pair of displacement shears and presses it together until it is virtually free of meat. One of the displacement shears is expanded away to the rear from the mouth 10 (see arrow 25), so that a meat-free top end 82 is formed. The clip device 23 is moved between the expanded displacement shears of the constricting device 22. Said clip device is designed for the purpose of placing a respective clip 81 at each end of the top end 82. A sausage 8 is therefore produced and the operation begins again for the next sausage. Sausages 8 connected in the manner of string can thereby be produced; to separate the sausages 8, a separating device (not illustrated) can also be provided which severs the top end 82 between the two clips 81.

A moving belt 4 is arranged, according to the invention, downstream of the sealing device, as seen in the working direction. Said moving belt is guided around two bearing rollers 42 which are arranged transversely to the working direction and of which one is connected to a brushless synchronous motor as the drive 43 which can be adjusted in rotational speed. The drive 43 which can be adjusted in rotational speed is connected to a regulating unit 64 in the control unit 6. The regulating unit 64 is designed as a power converter and precisely regulates the speed of the moving belt 40 via the rotational speed of the drive 43.

A conveyor belt 48 is arranged at the rear end of the moving belt 40, as a further element of the removal device 4. It is provided with its own drive (not illustrated) which drives the conveyor belt 48 at a higher speed than the moving belt 40. The conveyor belt 48 is arranged below the end of the moving belt 40 and receives the sausages 8 ejected there and transports them for further processing.

Above the moving belt 40, in the region of the filling zone 5, two light barriers 71, 72 are arranged at a predetermined distance as the speed measuring means 7. They are arranged in such a manner that, during the filling operation, the sausage 8 first of all interrupts a light beam from the light barrier 72 which is closer to the filling pipe and, as the filling operation progresses, also interrupts a light beam from the light barrier 71 further away from the filling pipe. The two light barriers 71, 72 are connected to an evaluation unit 61. From the predetermined distance between the two light barriers 71, 72 and the time which has expired between the interruption of the two light beams of the light barriers 71, 72, said evaluation unit determines a growth rate of the sausage 8 as an output signal.

This output signal is applied to a first input of a synchronizing unit 62. The synchronizing unit 62 is designed in order to determine the speed of the moving belt 40 from the rotational speed of the drive 43 that is applied to a second input. The synchronizing unit 62 is provided with a comparator and determines a differential speed and compares it with an adjustable desired value. It can be zero or can have a positive value (i.e. the moving belt 40 is somewhat more rapid than the growth rate). A new rotational speed is set for the drive 43 as a function of this difference. Synchronism can therefore be achieved, i.e. the moving belt 40 moves as rapidly as the sausage 8 grows under the pressure of the sausage meat 85 flowing into the casing material 80. The casing material 80 is pulled off with a uniform force. The weight of the sausage therefore no longer influences the stuffing quality. Even very large and heavy sausages are uniformly stuffed. The internal diameter remains constant over the entire length of the sausage. In addition, an overloading of the casing material 80 due to excessive tensile stresses on account of the moving belt 40 running at too high a speed is reliably avoided. The risk of the formation of cracks or of bursting is therefore effectively counteracted. The processing reliability in the case of sausages 8 having a large internal diameter is therefore significantly improved. In certain cases, above all in the case of approximately medium-sized sausages 8, it may be desirable to move the moving belt 40 at a somewhat greater speed than the growth rate in order to increase the stuffing speed. This can be achieved by the difference being set to a corresponding value.

To adapt to sausages 8 of differing size, the light barrier 71 which is away from the filling pipe is guided on a spindle device 73 in a longitudinally displaceable manner. By rotation of the spindle device 73, the distance between the light barriers 71, 72 can be varied. The measuring distance for the determination of the growth rate therefore changes in order thereby to be able to adapt it to different lengths of the sausages 8 to be produced. The spindle device is actuated by a servodrive 74 which is activated by the evaluation unit 67. As a result, automatic adaptation of the length of the measuring distance to the respectively produced sausages can be achieved. The measuring accuracy and speed can therefore be selected as required both in the case of short and in the case of long sausages.

Figure 3:
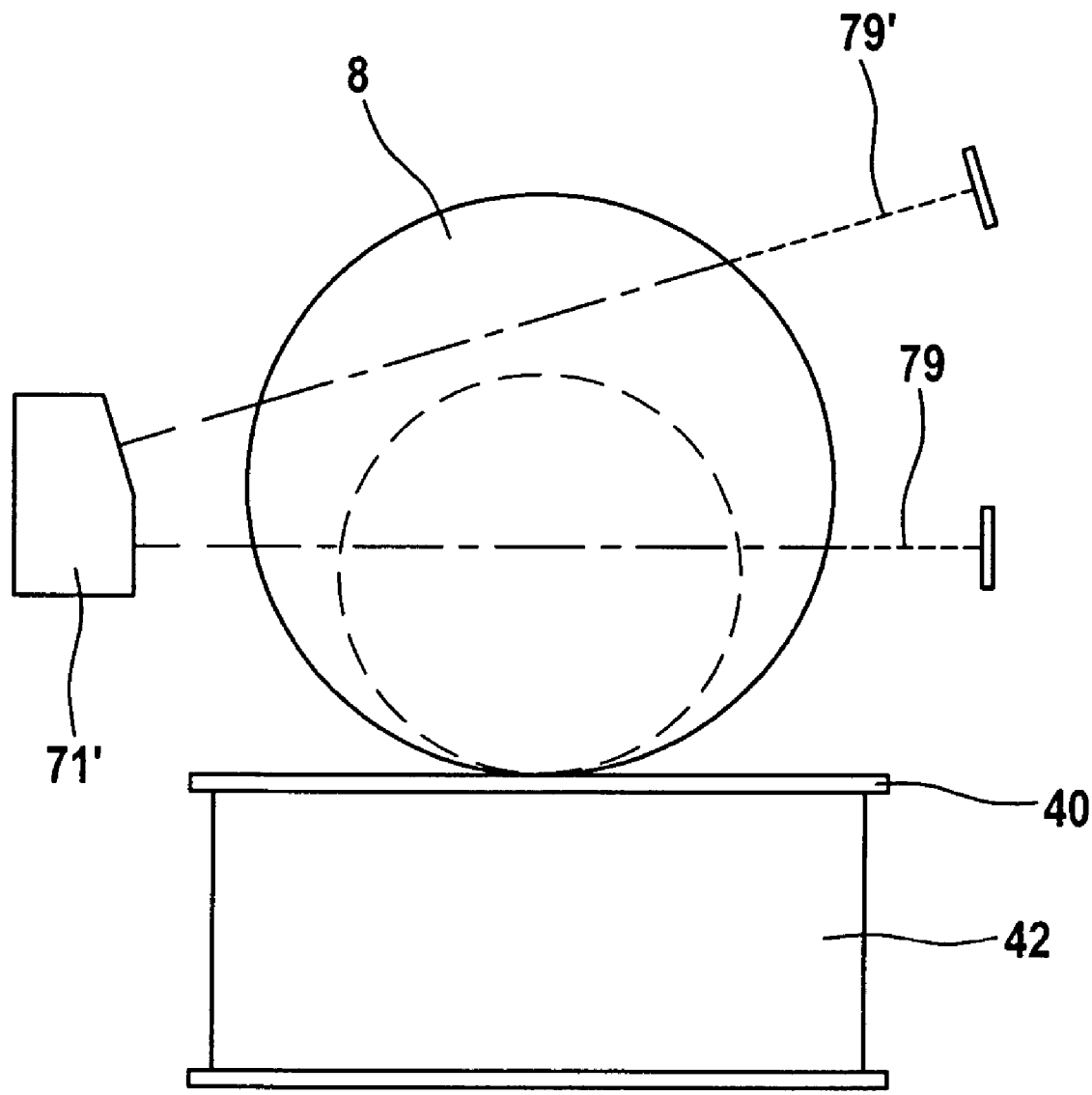
FIG. 3 shows an illustration of a sensor arrangement.

In the case of the embodiment illustrated in FIG. 3, the light barriers (only one is illustrated) are designed as double sensors 71' and are not arranged above the moving belt 40 but rather to the side of the filling zone 5. They emit two diverging light beams 79, 79'. One of the two light beams 79 is oriented in such a manner that it is interrupted even if the sausage 8 has a small internal diameter. The other 79' is directed upward and is only interrupted if a sausage 8 having a large internal diameter lies on the moving belt 40. The double sensor 71' can thereby be used not only to detect the length but in addition also to detect information about the diameter of the sausage 8. Apart from monitoring quality, this may expediently be used in particular for detecting gaps between sausages 8 of a string of sausages 88.

Figure 2:
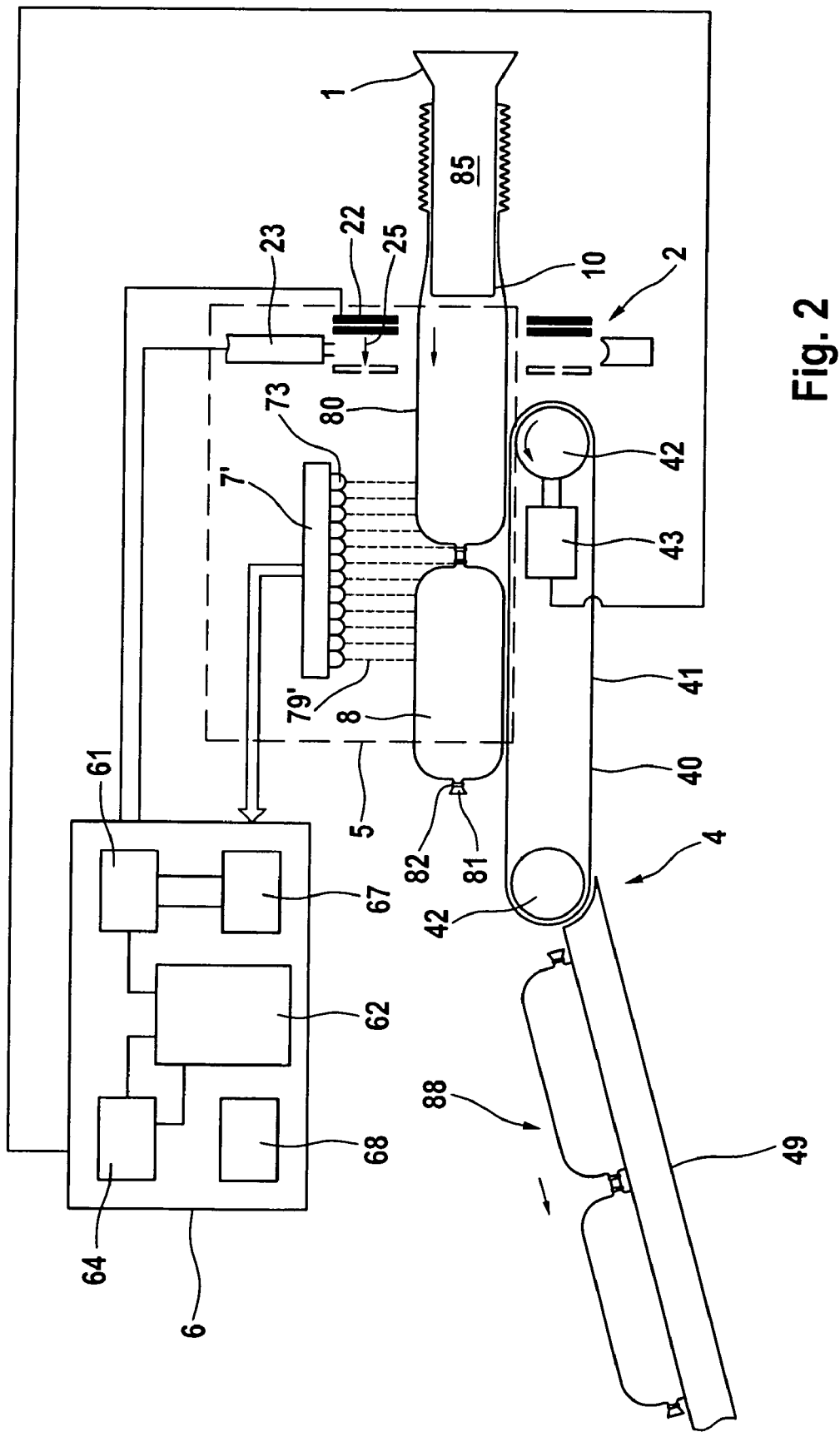
FIG. 2 shows a diagrammatic illustration of a second exemplary embodiment of the apparatus according to the invention.

FIG. 2 illustrates a second exemplary embodiment of the sausage processing apparatus according to the invention. It corresponds in its basic construction to the first exemplary embodiment illustrated in FIG. 1. Identical components bear the same reference numbers. In this respect, a more detailed description can be omitted. The differences are explained below.

Instead of the light barriers 71, 72 as speed measuring means 7, a line sensor 7' is provided in the second exemplary embodiment. It comprises a multiplicity of light barrier units 73 arranged in a row. It extends over virtually half of the filling zone 5 and is preferably somewhat longer than the sausages 8 to be produced. A plurality of line sensors 7' can also be arranged in a row. It is arranged in such a manner that the light beams emitted by the individual light barrier units 73 are interrupted by the casing material 80 of the sausage 8 that is filled with sausage meat 85 but not by the casing material 80 which has been constricted to form a top end 82 which is free from stuffing material. The multiplicity of light barrier unit 73 make it possible to measure the growth of the sausage 8 during the filling with sausage meat 85 in a finely resolved manner. The determination of the growth rate can also take place more rapidly, namely as the front end of the sausage 8 has at least reached the second of the light barrier units. Overall, there is therefore better measuring quality, to be precise both with respect to measuring accuracy and measuring speed. The line sensor 7' is connected to the evaluation unit 67 via a bus line formed in order to transmit multiple signals.

The fine resolution of the line sensor 7' makes it possible to detect the gap in strings of sausages 88. The uniformity of the individual sausages 8 of the string of sausages 88 can therefore also be monitored and, if appropriate, the speed of the moving belt 40 adapted. This permits a further improvement in the production quality.

The removal device 4 comprises a chute 49 at the end of the moving belt 40. It is arranged in a downwardly inclined manner, so that the sausages 8 ejected by the moving belt 40 are transported away onto it by gravitational force for further processing. This is an advantage in particular for the production of strings of sausages 88 if part of the string of sausages 88 still lies on the moving belt 40 and another part is already on the chute 49. The chute 49 does not impress any speed on the string of sausages, so that the introduction of tensile forces into the string of sausages 88 is avoided. As a result, the risk of a lowering of the stuffing quality or of tearing is counteracted.

The invention claimed is:

1. A sausage packaging apparatus for filling pasty stuffing material into tubular casing material, said apparatus comprising a filling pipe (1) wherein said filling pipe (1) comprises a mouth (10) that opens at a filling zone (5) and, wherein said filling pipe (1) comprises on its outside a receptacle for gathered tubular casing material (80), wherein said filling pipe (1) and gathered tubular casing material (80) are configured such that, in order to fill a sausage (8), the casing material (80), which is sealed on one end, is pulled off from the filling pipe (1) under the pressure of the stuffing material (85) and, wherein, when a certain size is reached by said filled sausage (8), said casing material (80) is sealed by a sealing device (2), wherein said apparatus further comprises a removal device (4), said removal device (4) comprising a moving belt (40) with an ejection region, for the filled sausage (8), characterized in that the moving belt (40) comprises a drive (43) that can be adjusted in rotational speed and that is actuated by a regulating module (64) of a control unit (6), and wherein said removal device further comprises a growth measuring device for measuring the growth of the sausage (8), said growth measuring device comprising a speed measuring means (7) for measuring the speed of growth of said sausage (8), said speed measuring means (7) arranged in said filling zone (5), and wherein said growth measuring device further comprises an evaluation unit (67) in communication with said speed measuring means (7) that evaluates the growth rate of the sausage (8) and a synchronizing unit (62) that activates the regulating module (64) such that synchronism is achieved between the speed of the moving belt (40) and the growth rate of said sausage (8).

2. The apparatus as claimed in claim 1, characterized in that the speed measuring means (7) comprises a plurality of light barriers (71, 72).

3. The apparatus as claimed in claim 2, characterized in that said light barriers are integrated into a line sensor (7).

4. The apparatus of claim 2, characterized in that at least one of the light barriers (71) is arranged adjustably in its distance from the mouth (10) of the filling pipe (1).

5. The apparatus as claimed in claim 4, characterized in that a servodevice (74) is provided for adjusting the light barrier (71) wherein said servodevice is actuated by the control unit (6).

6. The apparatus as claimed in claim 2, characterized in that the light barriers are designed as double sensors (71) that additionally detect the internal diameter of the sausage (8).

7. The apparatus as claimed in claim 1, characterized in that said apparatus further comprises a sausage string module with a clearance detector (68).

8. The apparatus as claimed in claim 1, characterized in that said moving belt (40) comprises an ejection region, and wherein said removal device (4) comprises a conveyor belt (48) which begins in the ejection region of the moving belt (40) and is operated at a speed independent of the moving belt (40).

9. The apparatus as claimed in claim 1, characterized in that said moving belt (40) comprises an ejection region, and wherein said removal device (4) has a conveying chute (49) which begins in the ejection region of the moving belt (40).

\* \* \* \* \*